(No Model.)

G. F. HARE.
MUCILAGE BOTTLE.

No. 572,603.  Patented Dec. 8, 1896.

WITNESSES
John Buckler
C. Gerst

INVENTOR
George F. Hare.
BY
Edgar Tate & Co
ATTORNEYS

UNITED STATES PATENT OFFICE.

GEORGE FREDERICK HARE, OF LIMERICK, IRELAND.

MUCILAGE-BOTTLE.

SPECIFICATION forming part of Letters Patent No. 572,603, dated December 8, 1896.

Application filed August 18, 1896. Serial No. 603,113. (No model.)

*To all whom it may concern:*

Be it known that I, GEORGE FREDERICK HARE, a subject of the Queen of Great Britain and Ireland, and a resident of 2 Pery Square, in the city of Limerick, in the county of Limerick, Ireland, have invented certain new and useful Improvements in Mucilage-Bottles, of which the following is a specification, reference being had to the accompanying drawings, forming a part thereof, in which similar numerals of reference indicate corresponding parts wherever found throughout the several views.

This invention relates to mucilage-bottles or receptacles; and the object thereof is to provide an improved device of this class which is simple in construction and operation and which cannot be clogged or closed by mucilage drying therein or thereon, a further object being to provide an improved mucilage bottle or receptacle which is supported in an inverted position by means of a suitable frame or support, and the neck of which is provided with an elastic tube which is perforated at the lower end and through which mucilage is forced to flow, when required for use, by pressure applied to said tube.

The invention is fully disclosed in the following specification, of which the accompanying drawings form a part, in which—

Figure 1:
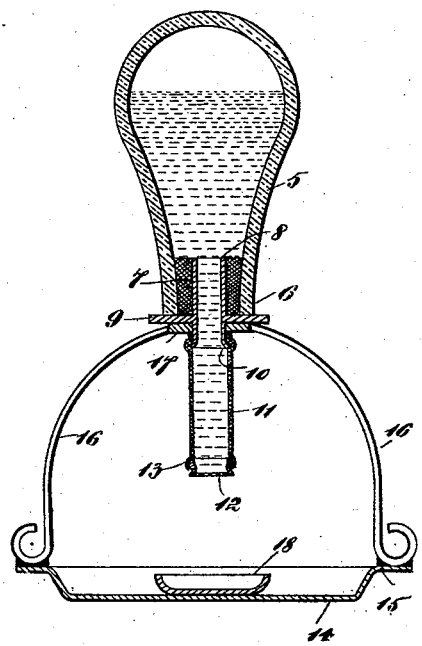
Figure 2:
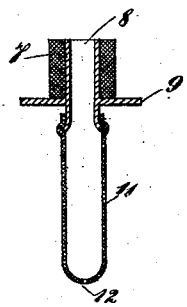

Figure 1 is a central vertical section of my improved mucilage bottle or receptacle, showing the same connected with its support, a part of which is also shown in section; and Fig. 2, a central vertical section of a modified form of neck attachment or elastic tube which I employ.

In the practice of my invention I provide a mucilage-bottle 5, which is preferably of the form shown in Fig. 1, but which may be of any desired shape, and said mucilage-bottle 5 is provided with a neck 6, into which is passed or forced a tubular stopper 7, which is composed of cork, rubber, or similar material, and I also provide a tube 8, which is passed centrally through said stopper and which is provided with an annular plate or flange 9, which is formed thereon or secured thereto and which is adapted to press on the end of the neck of the bottle, and said tube 9 is provided at its lower end with an annular or outwardly-directed flange or rim 10, and connected therewith is an elastic tube 11, which is preferably composed of rubber, and the lower end of said tube is closed at its lower end by a perforated plate or disk 12, which is provided with an annular upwardly-directed flange, on which is formed a bead 13, to which is secured the lower end of the flexible tube 11.

The disk or plate 12, which closes the lower end of the flexible tube, is preferably provided with a number of very small perforations, through which mucilage will not flow unless pressure is applied to the tube 11, and I also provide a base or receptacle 14, which is preferably dish-shaped in form and which is also preferably provided with an annular flange or rim 15, to which are secured side braces or supports 16, the upper ends of which are curved inwardly and connected with a circular head or plate 17, which is provided with a central opening through which the shorter end of the tube 8 is adapted to pass, and I also preferably provide one or more small dish-shaped receptacles 18, which are adapted to be placed in the base support or receptacle 14 beneath the tube 11.

In practice the bottle 5 is filled or partially filled with mucilage, and the plug or stopper 7 is forced thereinto. The upper end of the tube 8 is then passed through said plug or stopper and the lower end thereof through the plate or head 17, and the annular rim or bead 10 at the lower end of the tube 8 is preferably formed thereon after it has been passed through the plate or head 17, and the tube 11 is then connected therewith, as will be readily understood. My invention, however, is not limited to the method of connecting these separate parts, and the side arms or supports 16, the disk or plate 9, and the tube 11 may be rigidly connected, if desired, and in this event all that is necessary in order to fill the bottle or receptacle 5 is to disconnect the same therefrom, and said bottle may be disconnected from its support and filled whenever desired.

When it is desired to apply the mucilage to an envelop or other article, it is only necessary to pass the same beneath the disk or plate 12 and to press slightly upon the tube 11, or by applying pressure to the tube 11 the mucilage will be forced therefrom into the receptacle 18, or if said receptacle 18 is not employed the mucilage will drop into the dish-shaped base or support 14 and may be applied by means of a brush in the usual manner.

In Fig. 2 I have shown a modified form of the neck attachment, in which the tube 11 is closed at its lower end and perforated, as shown at 12, this perforation being made in the material of the tube itself, and the operation of this form of construction will be the same as that hereinbefore described.

My invention is not limited to the method of applying the mucilage after it has been forced from the tube 11, and it is evident that changes in and modifications of the construction herein described may be made without departing from the spirit of my invention or sacrificing its advantages.

Having fully described my invention, I claim as new and desire to secure by Letters Patent—

1. A mucilage-bottle provided with a neck, and a tube which is mounted therein, the outer end of which is provided with a flexible tube, which communicates therewith, and the free end of which is closed, and perforated, said bottle being adapted to be held in an inverted position, so that the mucilage will flow downward into said flexible tube, substantially as shown and described.

2. A mucilage-bottle provided with a neck, and a tube which is mounted therein, the outer end of which is provided with a flexible tube, which communicates therewith, and the free end of which is closed, and perforated, said bottle being adapted to be held in an inverted position, so that the mucilage will flow downward into said flexible tube, and being also provided with a base-support having side arms which are brought together at their upper ends, and connected with a plate or head through which the tube in the neck of the bottle, passes, substantially as shown and described.

3. A mucilage-bottle provided with a neck, and a tube which is mounted therein, the outer end of which is provided with a flexible tube, which communicates therewith, and the free end of which is closed, and perforated, said bottle being adapted to be held in an inverted position, so that the mucilage will flow downward into said flexible tube, and being also provided with a base-support having side arms which are brought together at their upper ends, and connected with a plate or head through which the tube in the neck of the bottle passes, and said base-support being also provided with a detachable receptacle, substantially as shown and described.

4. A mucilage-bottle and support therefor, consisting of a suitable dish-shaped base provided with side arms or supports which are brought together at their upper ends, and connected with an annular plate or head, said mucilage-bottle being also provided with a neck in which is placed a tubular plug or stopper, and a tube which is inserted thereinto, and the outer end of which is provided with a flexible tube, the free end of which is closed and perforated, substantially as shown and described.

In testimony that I claim the foregoing as my invention I have signed my name, in presence of the subscribing witnesses, this 8th day of August, 1896.

GEORGE FREDERICK HARE.

Witnesses:
JAMES AUGUSTINE DOYLE,
SAMUEL FERGUSON.